United States Patent [19]

Dieterich et al.

[11] Patent Number: 5,332,054
[45] Date of Patent: Jul. 26, 1994

[54] CONNECTION OF FRAME PARTS WITH PROFILED PANELS IN GRATINGS

[75] Inventors: Günter Dieterich, Dortmund; Karlheinz Piel, Schwerte; Paul-Werner Reinehr, Iserlohn-Rheinen; Hans-Werner Schulte, Schwerte, all of Fed. Rep. of Germany

[73] Assignee: Fried. Krupp AG Hoesch-Krupp, Essen, Fed. Rep. of Germany

[21] Appl. No.: 22,802

[22] Filed: Feb. 22, 1993

Related U.S. Application Data

[63] Continuation of Ser. No. 755,016, Sep. 4, 1991, abandoned.

[30] Foreign Application Priority Data

Sep. 5, 1990 [DE] Fed. Rep. of Germany ....... 4028124

[51] Int. Cl.⁵ ............................................. B60K 11/04
[52] U.S. Cl. .................................. 180/68.6; 180/68.1; 293/115
[58] Field of Search ................ 180/68.6, 68.4, 68.1; 293/115

[56] References Cited

U.S. PATENT DOCUMENTS

| 1,498,482 | 6/1924 | Rutherford | 293/115 |
| 1,631,846 | 6/1927 | Wilson | 180/68.6 |
| 1,694,696 | 12/1928 | Young | 180/68.6 |
| 1,971,155 | 8/1934 | Green | 180/68.6 |
| 2,071,673 | 2/1937 | Whitlock | 180/68.6 |
| 2,966,339 | 12/1960 | Morgan | 180/68.6 |
| 3,970,439 | 7/1976 | Murphy | 244/53 B |
| 4,619,313 | 10/1986 | Rhodes et al. | 180/68.4 |

FOREIGN PATENT DOCUMENTS 444840 3/1936 United Kingdom ................ 293/115

*Primary Examiner*—Eric Culbreth
*Attorney, Agent, or Firm*—Max Fogiel

[57] ABSTRACT

A connection between frame components (1) and the ends of parallel strips (3) of structural section in gratings (2) for special-purpose vehicles. The known connection is welded, and the welds do not withstand impact and abrasion as well as the rest of the material. To render the vicinity of the connection as resistant as the rest, the end of each strip is inserted in a matching aperture (4) in the frame component.

1 Claim, 4 Drawing Sheets

CONNECTION OF FRAME PARTS WITH PROFILED PANELS IN GRATINGS

The present invention is a continuation of application Ser. No. 07/755,016 filed Sept. 4, 1991, now abandoned.

BACKGROUND OF THE INVENTION

Special-purpose vehicles that are driven off-road usually have their engine space, including the cooling system, encapsulated to prevent vehicle failure due to damage to these components of the drive system from the penetration of foreign bodies. The engine is usually provided with combustion and cooling air through gratings. The engine spaces usually have two gratings to supply air to and remove it. A ventilator in the vicinity of the intake grating suctions in the requisite volumes of air. At the outlet grating the used air is allowed to flow out freely.

The specifications for such gratings usually include a large enough opening throughout the whole system to allow the requisite throughput of air and to create air channels, preventing the admission of foreign bodies.

The parallel strips of structural section known from German OS 3 703 716 are usually mounted in a frame. The ends of the individual strips of section are welded to associated components of the frame. The welds are accordingly exposed to impact and abrasion from the foreign bodies.

The welding produces areas of heat influx. The ballistic resistance of the sectional strips and frame components in these areas is lower than that of the material in general. It is also possible with this type of connection to ensure an intact weld between the frame components and the sectional strips.

An airborne-dust precipitator for engines or machinery is described in U.S. Pat. No. 3 970 439. Parallel sheets of foil are suspended in a frame. Mounting the edges of these sheets in slots or grooves in the sides of the frame is known from this patent. This known connection, however, cannot be used with gratings.

SUMMARY OF THE INVENTION

It is accordingly the object of the invention to provide a connection between frame components and sectional strips into gratings of the aforesaid type while improving the low ballistic resistance of the sectional strips and frame components in the aforesaid areas in relation to that of the material in general.

The particular advantages of the connection in accordance with the invention are that no welds are needed between the frame components and the sectional strip where they might be exposed to impact and abrasion. The areas in question will not be subject to heat influx and will resist just as well as the rest of the material.

Assembly of the gratings is also improved, especially when the sectional strips are made of composite materials.

Discrepancies in the strips' length and cross-section can easily be compensated by holes in the frame components. If the connection can be disestablished, individual damaged sectional strips can be rapidly replaced.

BRIEF DESCRIPTION OF THE DRAWINGS

Embodiments of the connection in accordance with the invention will now be specified by way of example with reference to the schematic drawing, wherein.

DESCRIPTION OF THE PREFERRED EMBODIMENTS

Figure 1:
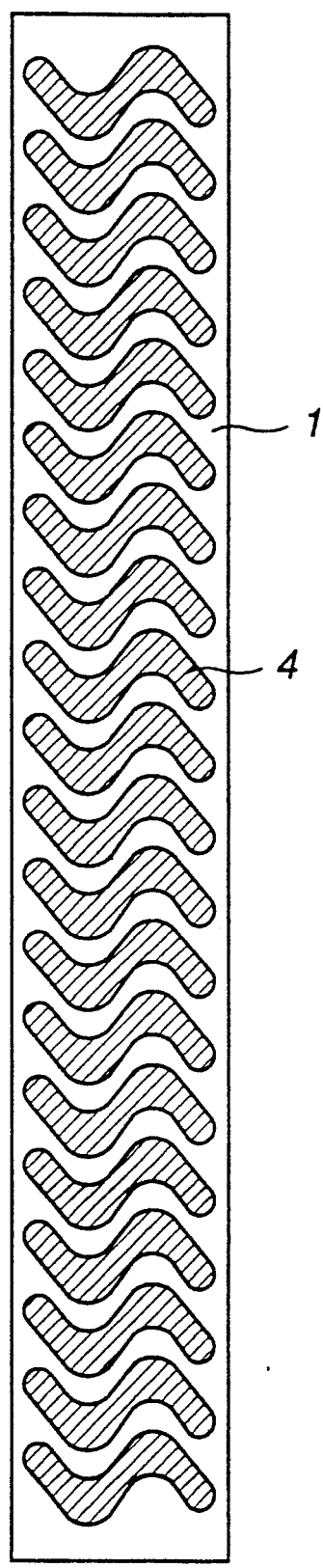
FIG. 1 is a side view of a frame component.

As will be evident from FIGS. 1 through 4, the lateral frame components 1 of a grating 2 have apertures 4. These apertures are apparent in the individual frame component 1 illustrated in FIG. 1. They match the cross-section of the grating's strips 3 of structural section. Depending on the material used for frame components 1, apertures 4 can be introduced into the component later by laser, plasma, or oxygen cutting, by milling and/or boring, by punching, or by other types of machining.

It is also possible, when frame components 1 are molded, cast, or sintered, to introduce apertures 4 during the original manufacturing process. The final form can be attained with or without additional processing.

Apertures 4 can be designed to accommodate discrepancies in the tolerated thickness of sectional strips 3. Discrepancies in length can be compensated by the mode of insertion into the apertures in frame components 1.

Figure 2:
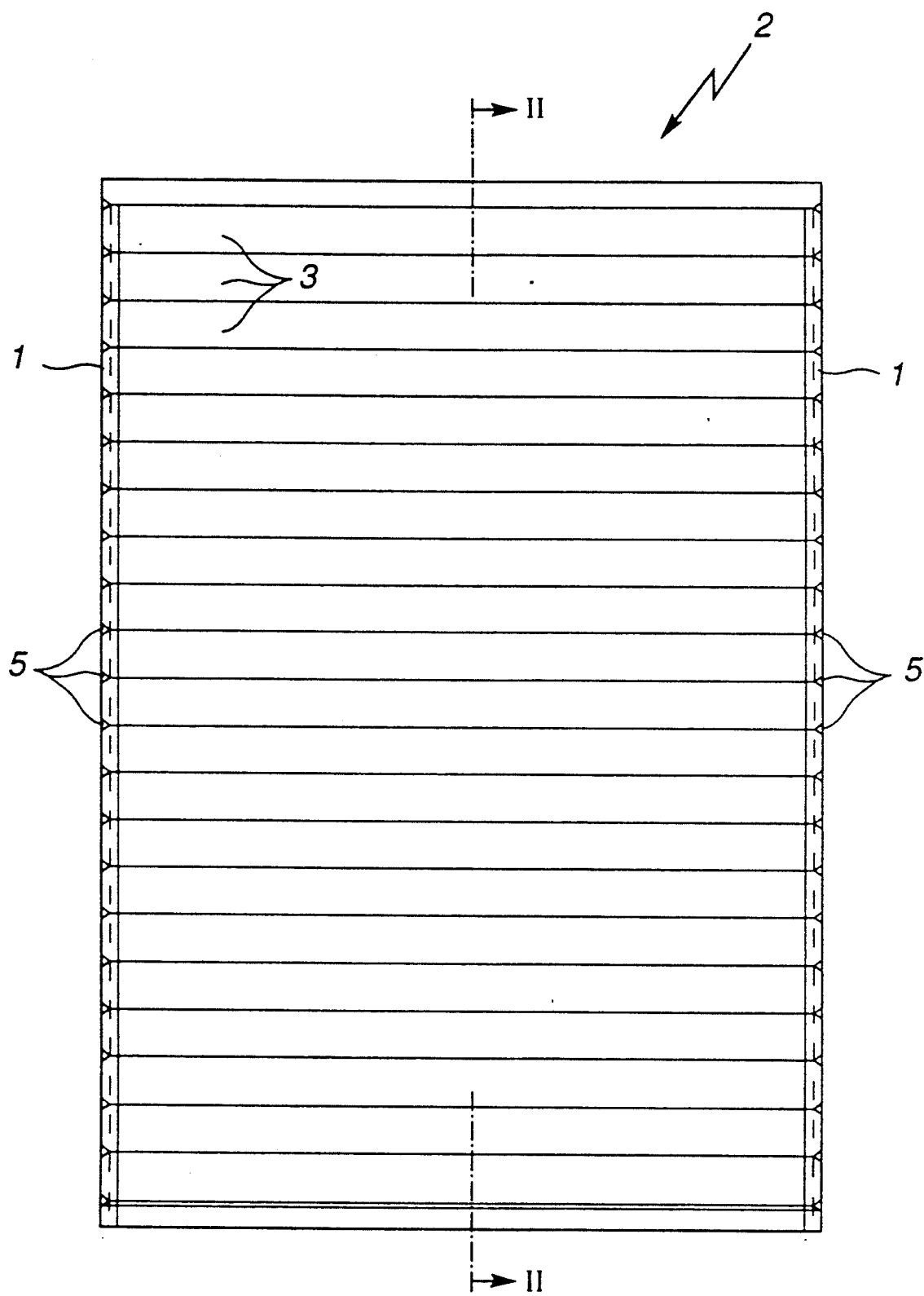
FIG. 2 is a view of one embodiment of a grating, 14
Figure 3:
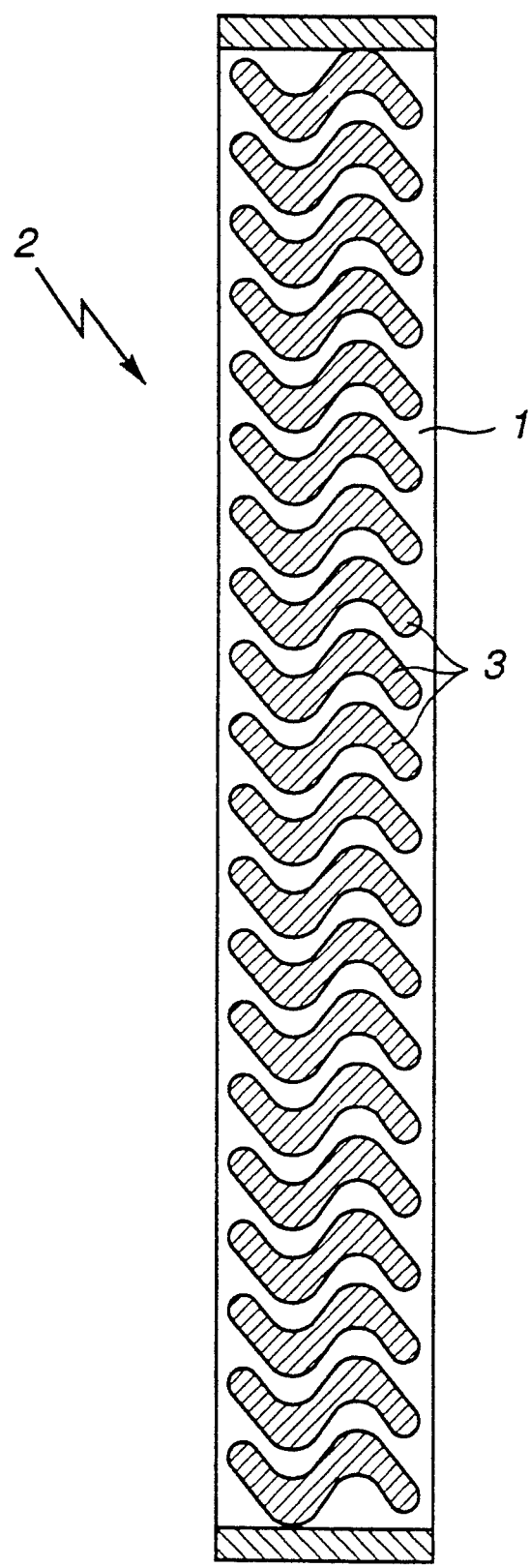
FIG. 3 is a section along the line II—II in FIG. 2.

FIGS. 2 and 3 are a view of and section through a complete grating 2. Sectional strips 3 have been inserted into the apertures 4 in frame components 1. The strips have been permanently secured to the averted surface of frame component 1 by welds 5. The welding also immobilizes the strips. The connection can also be established by soldering, cementing, or other mechanically permanent means.

The spacing between sectional strips 3 that connect frame components 1 together can be ensured with unillustrated spacers.

Figure 4:
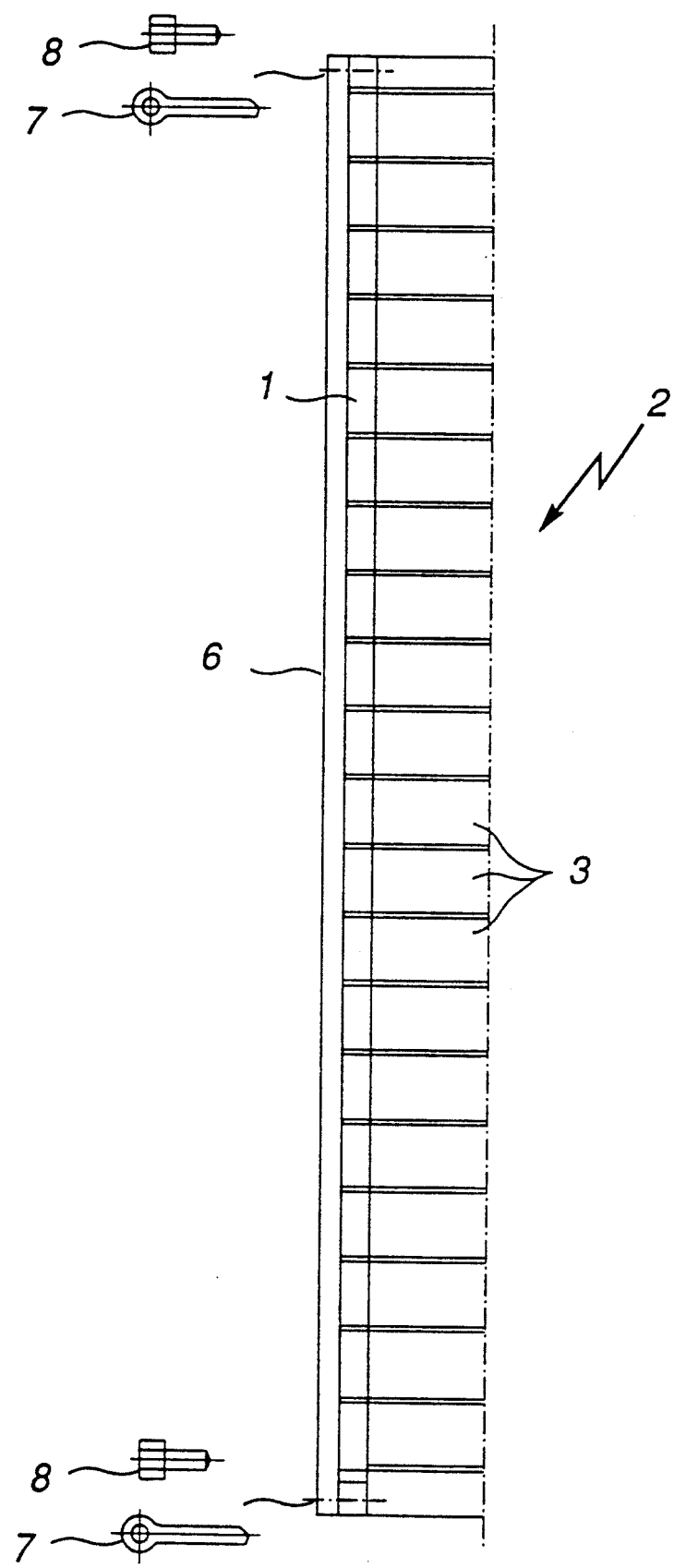
FIG. 4 is a view of part of another embodiment of a grating.

FIG. 4 represents part of one embodiment of a grating 2 with strips 3 of structural section that have been loosely inserted into the apertures 4 in frame components 1. The loose sectional strips in this embodiment are prevented from moving around in the frame components 1 by providing the outer side of the frame components with an additional loose and matching positioning plate 6.

Positioning plate 6 forces down on strips 3 and prevents them from moving around in frame components 1. The plate matches frame components 1.

Positioning plate 6 can be connected to component 1 by insertion with or without cotter pins 7, screws 8, or other but unillustrated loose connections.

The connection in accordance with the invention is basically also useful in other intake, outlet, and barrier gratings in fluids to improve the resistance of the joint between the strips and the frame to impact and abrasion.

We claim:

1. A grating arrangement for removal of foreign matter from air streams flowing in off-road motor vehicles, comprising: means for directing air streams through an off-road vehicle, said airstreams having foreign matter to be removed from said airstreams; a plurality of parallel strips of structural section in the path of an air stream and having a predetermined contoured surface and cross-section along said strips for preventing transmission of said foreign matter past said strips; and frame members for supporting and mounting said parallel strips; said frame members having contoured apertures corresponding to said predetermined cross-section so that said strips are insertable into and through said apertures and held firmly in place by said frame members free from welds, so that said strips are freely replaceable without cutting and non-manual detaching operations, said strips having a length free of welds and transmitting air streams undisturbed fully along said length and at ends of said length, said contoured apertures corresponding to contours of said strips for removal of said foreign matter from said air streams; additional frame members located on outer sides of said first-mentioned frame members and having apertures identical in shape and location to said apertures of said first-mentioned frame members; said strip having ends inserted impermanently through both the apertures of said first-mentioned frame members and being securely held in said apertures of both said first-mentioned frame and said additional frame members by substantial displacement of the apertures of said additional frame members relative to the apertures of said first-mentioned frame members; and fastening means for fastening said additional frame members to said first-mentioned frame members after displacement of the apertures of said additional frame members relative to the apertures of said first-mentioned frame members.

* * * * *